(12) United States Patent
Lifshitz

(10) Patent No.: US 6,833,840 B2
(45) Date of Patent: Dec. 21, 2004

(54) PROTO IMPLEMENTATION IN MPEG-4

(75) Inventor: Zvi Lifshitz, Jerusalem (IL)

(73) Assignee: Optibase LTD, Herzelia (IL)

( * ) Notice: Subject to any disclaimer, the term of this patent is extended or adjusted under 35 U.S.C. 154(b) by 0 days.

(21) Appl. No.: 09/782,085

(22) Filed: Feb. 14, 2001

(65) Prior Publication Data

US 2003/0177470 A1 Sep. 18, 2003

Related U.S. Application Data

(60) Provisional application No. 60/182,212, filed on Feb. 14, 2000.

(51) Int. Cl.$^7$ ................................. G06T 9/00
(52) U.S. Cl. ................... 345/630; 345/619; 715/500.1; 715/515; 382/240; 382/232
(58) Field of Search .................. 345/630, 629, 345/619, 581, 631, 704, 716, 719–721; 715/500.1, 514, 515, 530, 901; 382/232, 234, 235, 240; 706/59, 60, 55, 50, 46

(56) References Cited

U.S. PATENT DOCUMENTS

| | | | | |
|---|---|---|---|---|
| 5,278,946 A | * | 1/1994 | Shimada et al. | 715/514 X |
| 5,813,020 A | * | 9/1998 | Hohensee et al. | 715/515 |
| 6,195,088 B1 | * | 2/2001 | Signes | 715/500.1 |
| 6,266,053 B1 | * | 7/2001 | French et al. | 715/500.1 |
| 6,557,017 B1 | * | 4/2003 | Venable | 345/619 X |

\* cited by examiner

*Primary Examiner*—Raymond J. Bayerl
(74) *Attorney, Agent, or Firm*—Eitan, Pearl, Latzer & Cohen Zedek, LLP

(57) ABSTRACT

A method of PROTO implementation in MPEG-4 is provided, including the steps of: defining a PROTO object class, instantiating a PROTO object, calling the PROTO object into an MPEG-4 scene graph, and rendering the PROTO object.

4 Claims, 12 Drawing Sheets

PROTO IMPLEMENTATION IN MPEG-4

CONTINUATION DATA

This Patent Application claims priority from U.S. Provisional Patent Application Ser. No. 60/182,212, filed on Feb. 14, 2000, which is incorporated herein by reference.

FIELD OF THE INVENTION

The present invention relates to computer network based multimedia application in general, and more particularly to PROTO implementation in MPEG-4.

BACKGROUND OF THE INVENTION

ISO/EEC 14496, commonly referred to as "MPEG-4," is an international standard for coding of multimedia. Part 1 of the standard includes specifications for the description of a scene graph comprising one or more multimedia objects. Part 5 of the standard includes a software implementation of the specifications in the form of an MPEG-4 player. An MPEG-4 player parses a bitstream containing a scene description, constructs the scene graph, and renders the scene.

ISO/IEC 14496 specifies a system for the communication of interactive audio-visual scenes. This specification includes the following elements:

- The coded representation of natural or synthetic, two-dimensional (2D) or three-dimensional (3D) objects that can be manifested audibly and/or visually (audio-visual objects);
- The coded representation of the spatio-temporal positioning of audiovisual objects as well as their behavior in response to interaction;
- The coded representation of information related to the management of data streams, including synchrorization, identification, description and association of stream content; and
- A generic interface to the data stream delivery layer functionality.

The overall operation of a system communicating audio-visual scenes may be summarized as follows. At the sending terminal, the audio-visual scene information is compressed, supplemented with synchronization information, and passed to a delivery layer that multiplexes it into one or more coded binary streams that are transmitted or stored. At the receiving terminal, these streams are demultiplexed and decompressed. The audio-visual objects are composed according to the scene description and synchronization information, and are presented to the end user. The end user may have the option to interact with this presentation. Interaction information can be processed locally or transmitted back to the sending terminal. ISO/IEC 14496 defines the syntax and semantics of the bitstreams that convey such scene information, as well as the details of their decoding processes.

An audiovisual scene in MPEG-4 is composed from one or more individual objects or "nodes" arranged in an object tree, including primitive media objects that correspond to leaves in the tree and compound media objects that group primitive media objects together, encompassing sub-trees. For example, the primitive media objects corresponding to a visual representation of a talking person and his corresponding voice may be tied together to form a compound media object, containing both the aural and visual components of the talking person. Each node is of specific node-type, representing elements such as lines, squares, circles, video clips, audio clips, etc.

Scene description in MPEG-4 addresses the organization of audio-visual objects in a scene, in terms of both spatial and temporal attributes. This information enables the composition and rendering of individual audio-visual objects after the respective decoders have reconstructed the streaming data for them. The scene description is represented using a parametric approach, such as is defined by the Binary Format for Scenes (BIFS). The description consists of an encoded hierarchy/tree 100 of scene description nodes with attributes and other information, including event sources and targets, as illustrated in prior art FIG. 1. Leaf nodes 102 of tree 100 correspond to elementary audio-visual data, whereas intermediate nodes 104 group this material to form compound audio-visual objects, and perform grouping, transformation, and other such operations on audio-visual objects. The scene description can evolve over time by using scene description updates. (Dashed lines indicate links to leaf nodes not shown).

In order to facilitate active user involvement with the presented audio-visual information, ISO/IEC 14496 provides support for user and object interactions. Interactivity mechanisms are integrated with the scene description information in the form of "routes," which are linked event sources and targets, and "sensors," which are special nodes that can trigger events based on specific conditions. These event sources and targets are part of scene description nodes, and thus allow close coupling of dynamic and interactive behavior with the specific scene at hand. Scene description node fields may be connected though routes, which cause a change in one node to affect the properties and behavior of another node. Constructing a scene involves parsing the scene hierarchy, node types, node fields values, and routes and linking them all in a scene graph.

Part 5 of the MPEG-4 standard provides reference software that implements different aspects of the MPEG-4 specification. One portion of the reference software is referred to as IM1, which includes several modules. The IM1 core module parses scene description bitstreams, constructs the memory structure of the scene graph, and prepares the scene graph for the Renderer module which traverses the scene graph and renders it on the terminal hardware (e.g., screen, speaker). IMI implements a two-plane approach in its handling of the scene graph. The two planes are referred to as the Scene Manipulation Plane and the Renderer Plane. The Scene Manipulation Plane parses the scene description stream, constructs the scene graph, manipulates it, and handles route activation without knowledge of the semantics of the node. The Renderer Plane traverses the scene graph and renders it without knowledge of the syntax of the scene description bitstream. The two planes are inplemented as two separate modules that communicate via the scene graph.

The IM1 player architecture is illustrated in FIG. 2. The core, generally designated 200, includes sub-modules that parse the scene description and construct the scene tree, collectively implementing the Scene Manipulation Plane. Modules 202 and 204 interact with the core module 200 through APIs. The Renderer 206 traverses the scene graph and renders the scene, implementing the Renderer Plane. Core 200 and Renderer 206 interface through a Scene Graph Interface 208.

IM1 scene graph elements are represented several main classes including:

| | |
|---|---|
| MediaObject | a base class for nodes. |
| NodeField | a base class for node fields. |
| Route | representing a route. |

Specific node types are represented by classes derived from MediaObject. There are two layers of inheritance. For each node type, a class is derived from MediaObject implementing the specific node syntax. Each node can then be overloaded by specific implementations of MPEG players in the Renderer Plane to implement the rendering of the scene graph For example, the Appearance node is declared as:
class Appearance:public MediaObject

```
{
    BIFS_DECLARE_NODE
    exposedField SFMaterialNode material;
    exposedField SFTextureNode texture;
    exposedField SFNode<class TextuxeTransform>textureTransform;
};
```

BIFS_DECLARE_NODE is a macro that declares virtual functions, described below, that overloads the pure declarations in MediaObject.

The implementation of Appearance is as follows:
BIFS_IMPLEMENT_NODE_START(Appearance)
   BIFS_FIELD(Appearance, material, 0, 0, 0, -1, 0, 0)
   BIFS_FIELD(Appearance, texture, 1, 1, 1, -1, 0, 0)
   BFS_FIELD(Appearance, textureTransform, 2, 2, 2, -1, 0, 0)
BIS_IMPLEMENT_NODE_END(Appearance)
BIFS_IMPLEMENT_NODE_START, BIFS_IMPLEMENT_NODE_END and BIFS_FIELD are macros that are used together to define the field table for each node. MediaObject uses these tables to access the fields of its derived objects in a generic way using virtual methods that are declared as "pure" in MediaObject and overloaded by each node. Example of these methods include:

| | |
|---|---|
| int GetFieldCount ( ); | // get the number of fields in the node |
| const BifsFieldTable *GetFieldTable ( ); | // get a pointer to the field table |
| NodeField *GetField (int nIndex); | // get a pointer to the NodeField object of a specific field |

This mechanism ensures that once nodes are instantiated and inserted into the scene graph, their fields can be accessed by their serial number from the base MediaObject class. While processing scene update commands or routes, the Scene Manipulation Plane uses this technique to manipulate the scene graph.

There are several types of node fields, including the integer field (SFInt), character string field (SFString), or node field that points to child nodes (SFNode). In addition, node fields are either scalar (e.g., SFInt), or vector-based (e.g., MFInt). NodeField is the base class for node fields. Specific field types are implemented by classes that extend NodeField. NodeField uses virtual methods to overload classes in order to implement functionality that is specific to a certain field type. For example, the virtual method Parse is used to parse a field value from the scene description bitstream.

ROUTE is the mechanism to mirror a change in a field of one node in the scene graph into a field in another node. ROUTEs are implemented by the Route class. Among the member variables of this class are a pointer to the source node, a pointer to the target node, and serial numbers of the fields in the source and target nodes. The Route class also has an Activate method. Each NodeField object contains a list of all the routes that originate from this field. Whenever the field value is changed, the Activate method is called on all these routes. This method locates the target node of the route, calls its GetField method to get the target field, and copies the value of the source field to the target field. Copying is performed by the assignment operator, which is overloaded by each instance of NodeField.

In the Renderer Plane, Render is defined as a virtual method in MediaObject. Each node overloads this method with a specific Render method, which renders the node and all its child nodes. The Render methods are implemented so that each instance accesses the node; fields by their names, having knowledge of their types and semantics. This differs from the generic behavior of the Scene Manipulation Plane, which uses the GetField method to access node fields and has no knowledge about the specifics of each node.

Version 2 of the MPEG-4 standard introduces PROTOs. A PROTO is a parameterized sub-tree that can be defined once and be called into the scene graph at many places without repeating information. PROTO was introduced as a way to save bandwidth and authoring effort. A PROTO is a sub-graph of nodes and routes that can be defined once and inserted anywhere in the scene graph. This subgraph represents the PROTO code. A PROTO exposes an interface, which is a set of parameters whose syntax is similar to node fields. The parameters are linked to node fields in the PROTO code. These fields are called "ISed" fields. A node is instantiated by using its name in the scene graph and assigning values to its interface parameters. The scene graph parser handles PROTO instances as regular nodes, viewing only its interface, while the Renderer processes the PROTO code.

PROTOs may be better understood with reference to FIGS. 3 and 4 which represents a scene having two Person objects. In FIG. 3 both Person objects 300 and 302 have the same structure, each comprising a Voice object 304 and a Sprite object 306. The Voice and Sprite objects 304 and 306 may have different attributes as expressed by different field values.

FIG. 4 shows the same scene when PROTO is used. A Person PROTO 400 is defined once, and instantiated twice, as Person1 402 and Person2 404. Thus, the Voice and Sprite objects are not themselves duplicated as they are in FIG. 3.

PROTOs provide a way to define new nodes by combining the functionality of predefined nodes. Scenes that use PROTOs contain a section of PROTO definitions, which can then be instantiated in the scene and used like normal nodes. While PROTOs are beneficial in theory, an efficient implementation of PROTOS remains elusive. PROTOs should be implemented in such a way that provides more benefit than cost. Specifically, PROTO implementation should require minimal changes to the IM1 code, in order not to compromise the efficiency and stability of the code. Furthermore, changes should be made in the Scene Manipulation Plane so that no modifications will be required at the Renderer Plane. The complex and divergent tasks of PROTO definition and PROTO instantiation must be clearly defined. Although PROTO can be used as a node, their structure is different than other MPEG-4 nodes that have fixed fields that are described by hard-coded node tables, while PROTO fields are defined at run-time. PROTOs should also be kept hidden from the Renderer. Without PROTOs, the Renderer traverses the scene graph from fields that point to nodes down to the nodes themselves. With PROTOs, fields might point to a PROTO instance instead of to a node of a known type, with the Renderer incapable of directly rendering a PROTO node.

SUMMARY OF THE INVENTION

The present invention seeks to provide an efficient PROTO implementation in MPEG4.

In accordance with the present invention, a method of PROTO implementation in MPEG-4 is provided, including the steps of: defining a PROTO object class, instantiating a PROTO object, calling the PROTO object into an MPEG-4 scene graph, and rendering the PROTO object.

In accordance with another embodiment of the present invention, the defining step of the method includes: defining the class by inheriting the class from MediaObject, defining: in the class a variable representing an array of NodeField* objects, inserting PROTO fields into the array of NodeField* objects, defining in the class a variable representing an array of BifsFieldTable structures, inserting descriptions of the PROTO fields into the array of BifsFieldTable structures, overloading GetFieldCount, GetFieldTable and GetField methods of the PROTO class, locating PROTO field objects, defining in the class a variable representing an array of pointers to the MediaObject, inserting at least one PROTO code node into the array of pointers to the MediaObject, defining in the class an array of pointers to routes, inserting at least one PROTO code route into the array of pointers to routes, linking at least one PROTO code ISed node field to a corresponding PROTO interface field by a route object, linking at least one IN parameter to a node field by a route object, linking at least one OUT parameter to a node field by a route object, linking at least one IN/OUT parameter by two routes, one for each direction, and adding any of the routes to a field of the PROTO object.

In accordance with another embodiment of the present invention, the instantiating step of the method includes: cloning an original PROTO object, cloning each node field of the original PROTO object, returning a pointer to the clone object, copying the value of each of the node fields to a NodeField object, cloning a route that connects two of the node fields between a source node and a target node, cloning at least one interface field object of the original PROTO object, storing the cloned interface field objects in the clone object, cloning at least one PROTO object node, cloning at least one PROTO object route, and returning a pointer to the clone PROTO.

In accordance with another embodiment of the present invention, the calling step includes: overloading either of the –> operator of SFGenericNode and the [] operator of MFGenericNode of the PROTO object, and if the node that is pointed to is a PROTO instance, returning the address of the first node of the PROTO object's PROTO code.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 5:
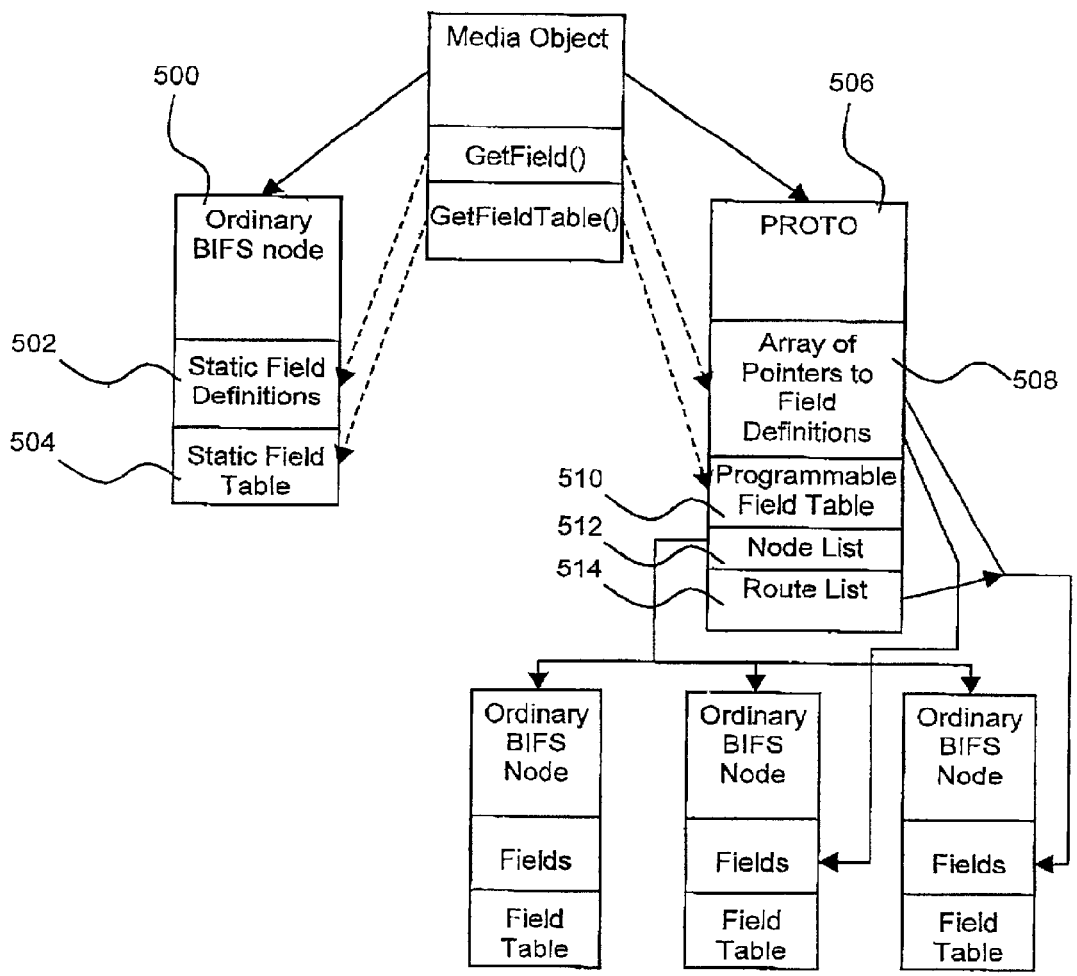
FIG. 5 is a simplified pictorial illustration of an exemplary class hierarchy showing a PROTO class structure, constructed and operative in accordance with a preferred embodiment of the present invention.
Figure 7:
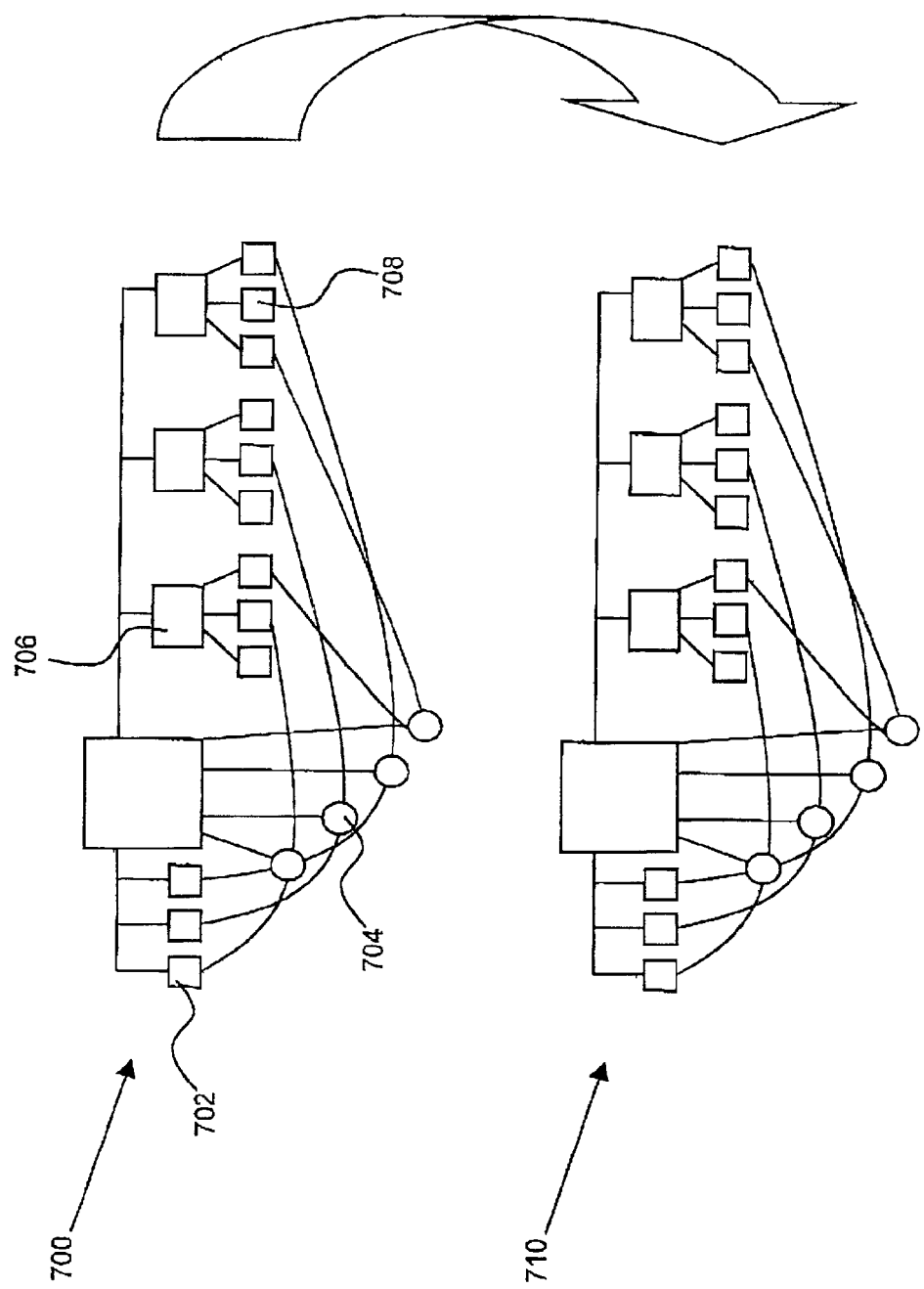
FIG. 7 is a simplified pictorial illustration of PROTO cloning, constructed and operative in accordance with a preferred embodiment of the present invention.
Figure 8:
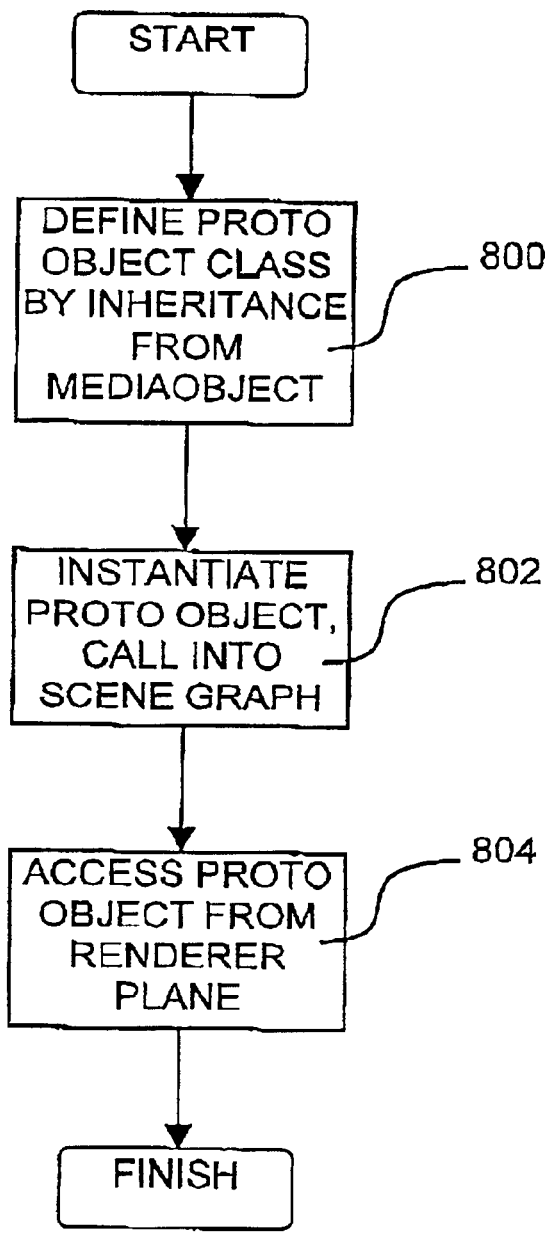
FIG. 8 is a simplified flowchart illustration of a high-level method of PROTO implementation in MPEG-4, operative in accordance with a preferred embodiment of the present invention.

Reference is now made to FIG. 8 which is a simplified flowchart illustration of a high-level method of PROTO implementation in MPEG-4, operative in accordance with a preferred embodiment of the present invention. In the method of FIG. 8 a PROTO object class is defined by inheriting the class from MediaObject (step 800). This is done so that PROTO objects will behave like a regular scene node. An exemplary class hierarchy showing a PROTO class structure is illustrated in FIG. 5. In FIG. 5 polymorphism, as shown in dashed lines and such as may be provided using C++ or other object oriented languages, is used to hide the differences between the fields 502 and 504 of an ordinary BIPS node 500, which are static and pre-defined, and the fields 508, 510, 512, and 514 of a PROTO node 506, which are defined dynamically. Fields 512 and 514 of PROTO node 506 represent two elements that do not exist in regular nodes, a list of nodes and a list of routes that are used to construct the PROTO code. Routes may be used to associate the PROTO fields with the corresponding node fields in the PROTO code. Thus, any modification to a PROTO field will be automatically mirrored in the associated node field, and vice versa Once the PROTO class is defined, a PROTO object is instantiated and called into the scene graph (step 802). A preferred method of PROTO object instantiation is referred to herein as "cloning," pictorially represented in FIG. 7 and described in greater detail hereinbelow with reference to FIG. 10. In FIG. 7 a PROTO definition, generally designated 700, is shown comprising PROTO fields 702, PROTO routes 704, PROTO nodes 706, and node fields 708 logically interconnected by pointers represented by solid arrow lines. A "clone" function is implemented in each of the Proto, MediaObject, NodeField and Route classes, such that each object clones itself and calls the clone functions of all the objects it contains. A cloned PROTO instance is shown, generally designated 710.

Figure 1:
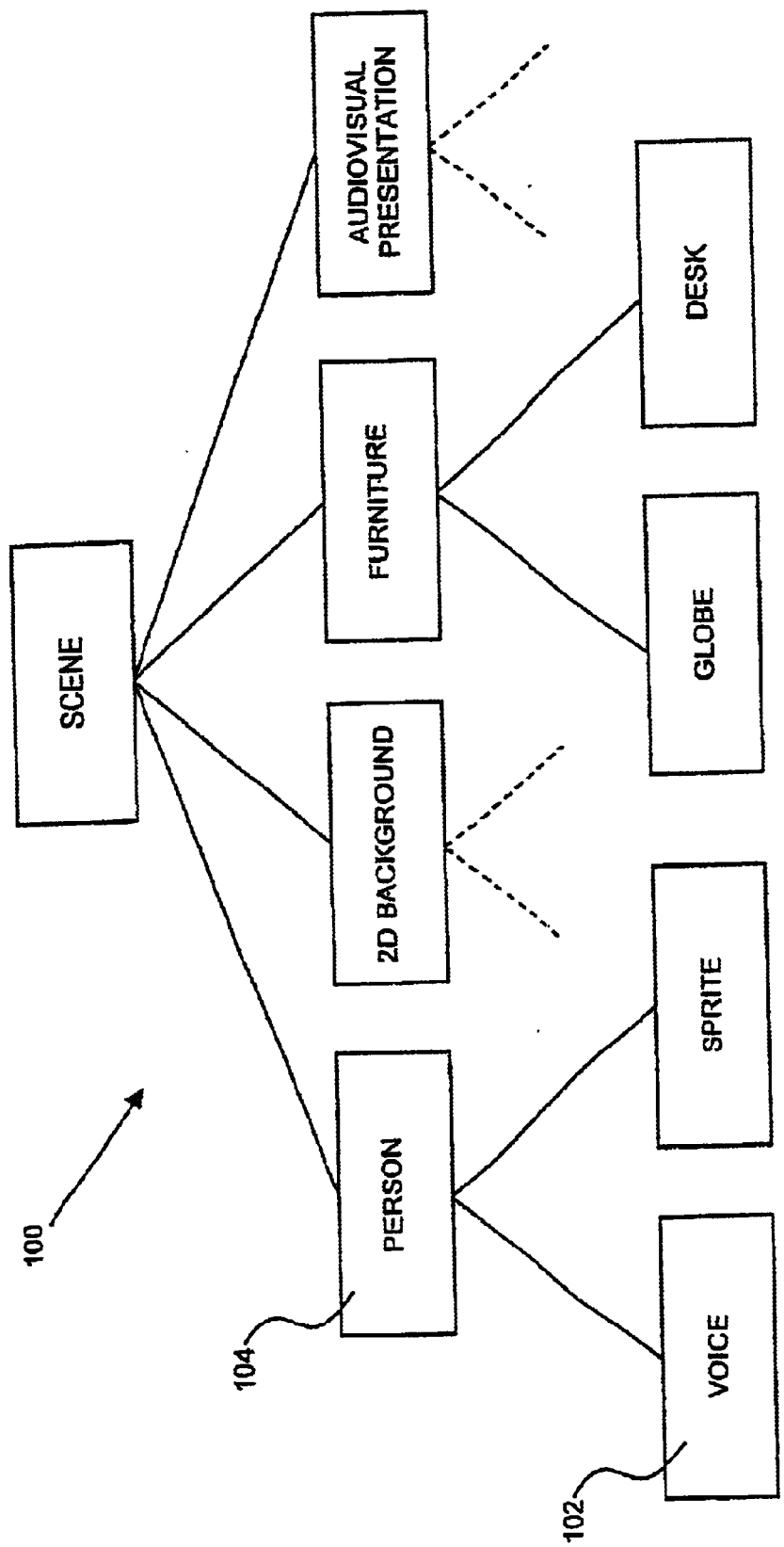
FIG. 1 is a simplified pictorial illustration of an MPEG-4 scene description useful in understanding the present invention.
Figure 2:
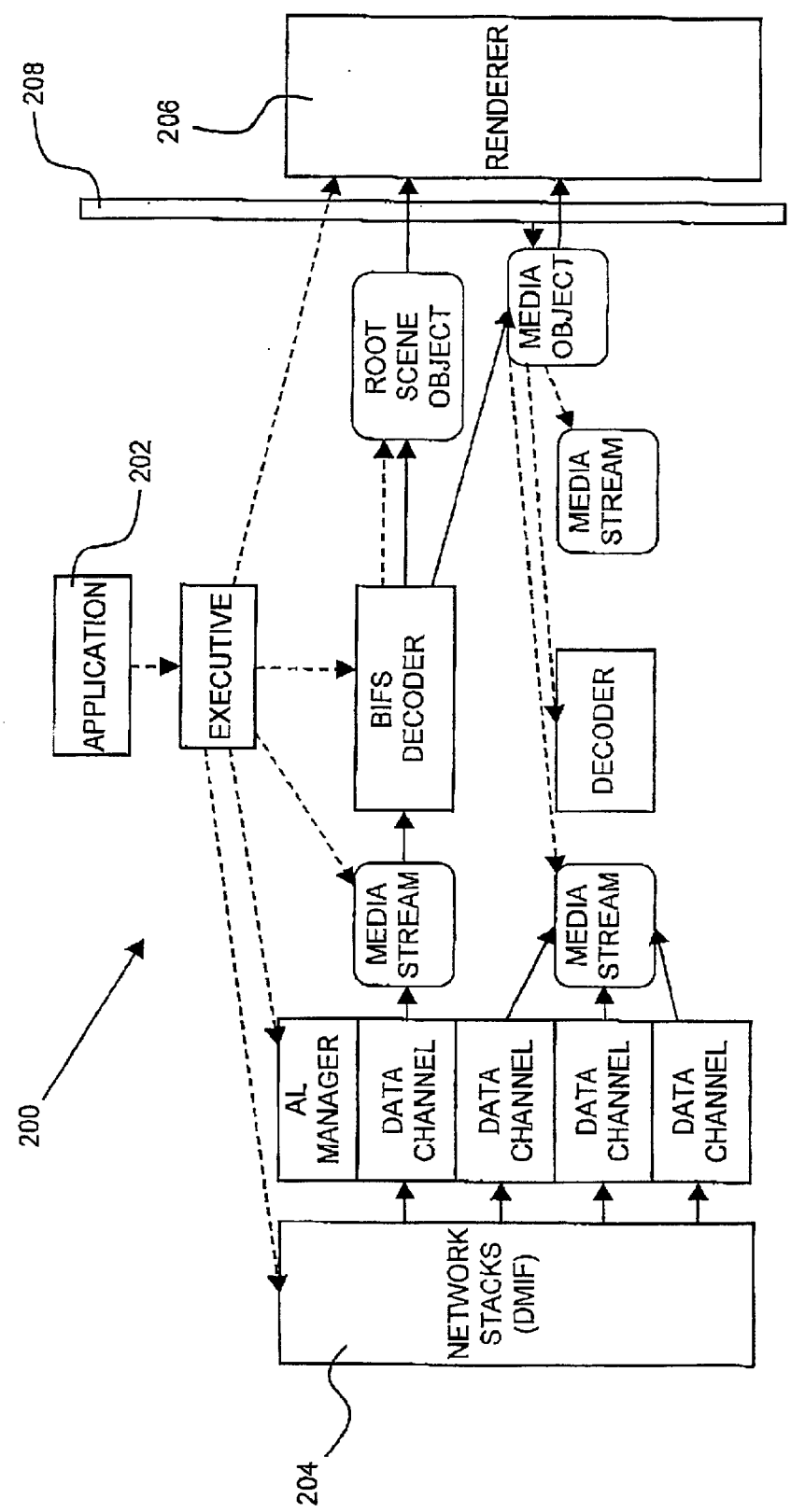
FIG. 2 is a simplified pictorial illustration of the IM1 player architecture of MPEG-4 which is useful in understanding the present invention.
Figure 3:
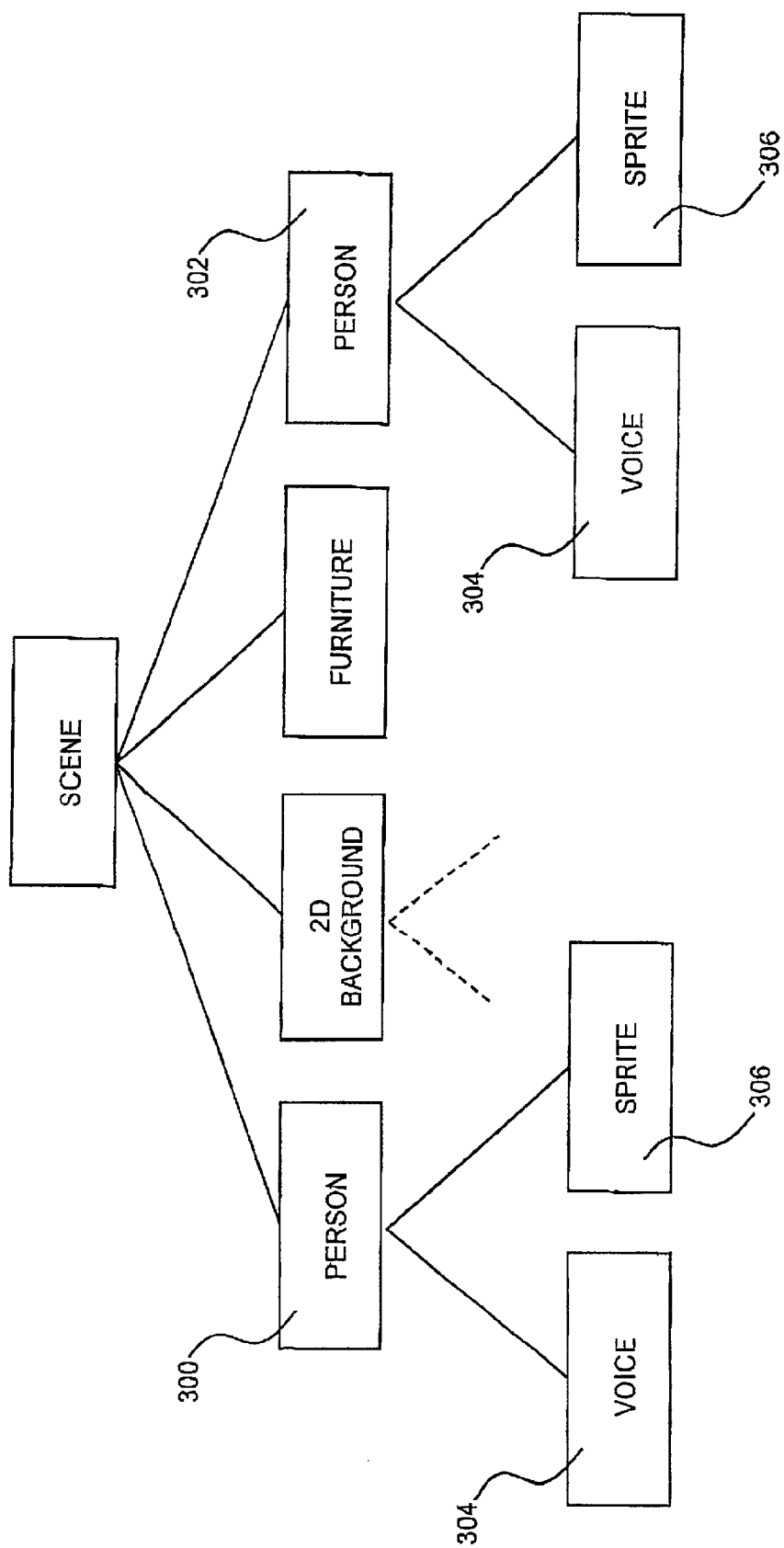
FIG. 3 is a simplified pictorial illustration of an MPEG-4 scene description having two Persons objects which is useful in understanding the present invention.
Figure 4:
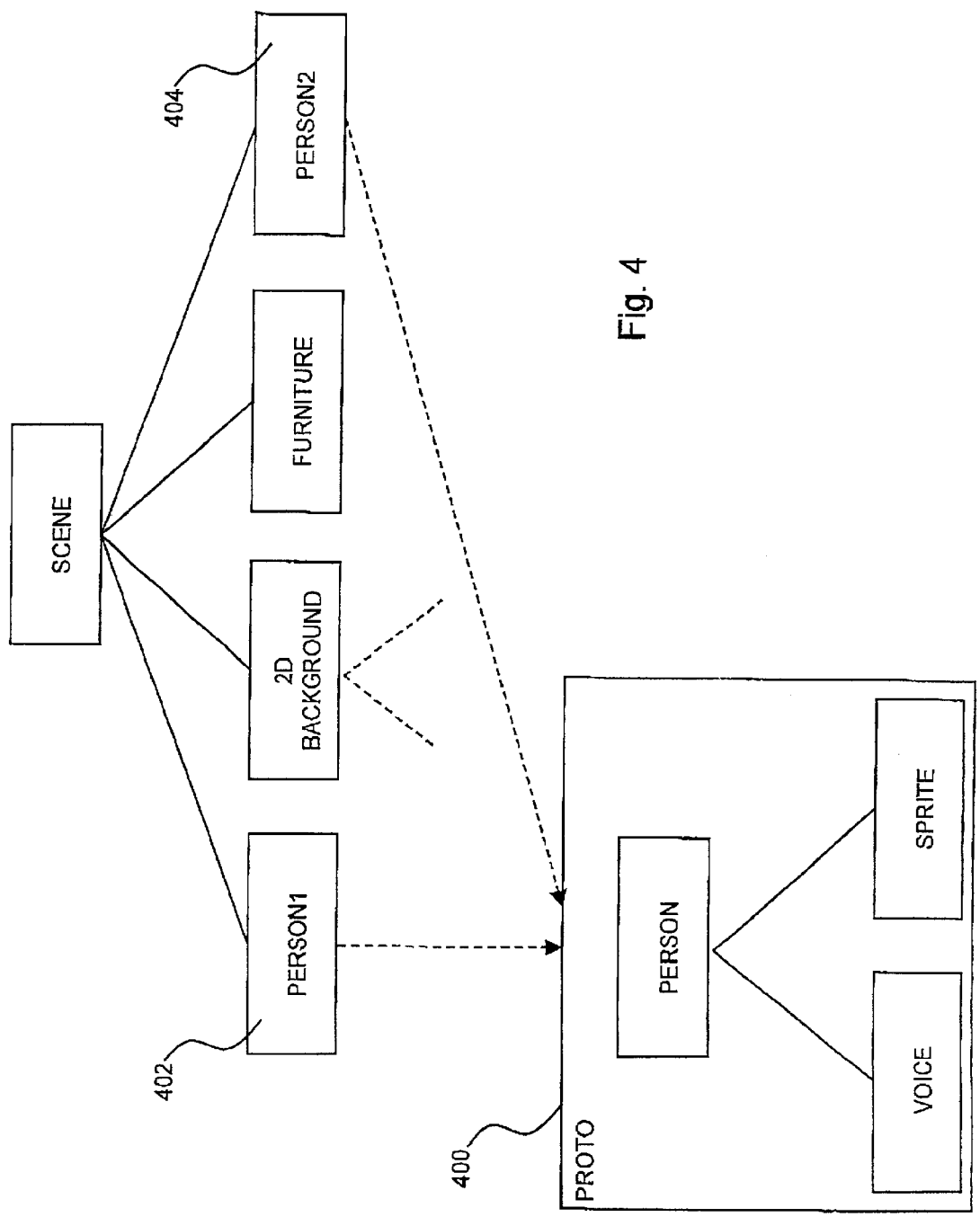
FIG. 4 is a simplified pictorial illustration of an MPEG-4 scene description having two Persons objects in a PROTO implementation which is useful in understanding the present invention.
Figure 6:
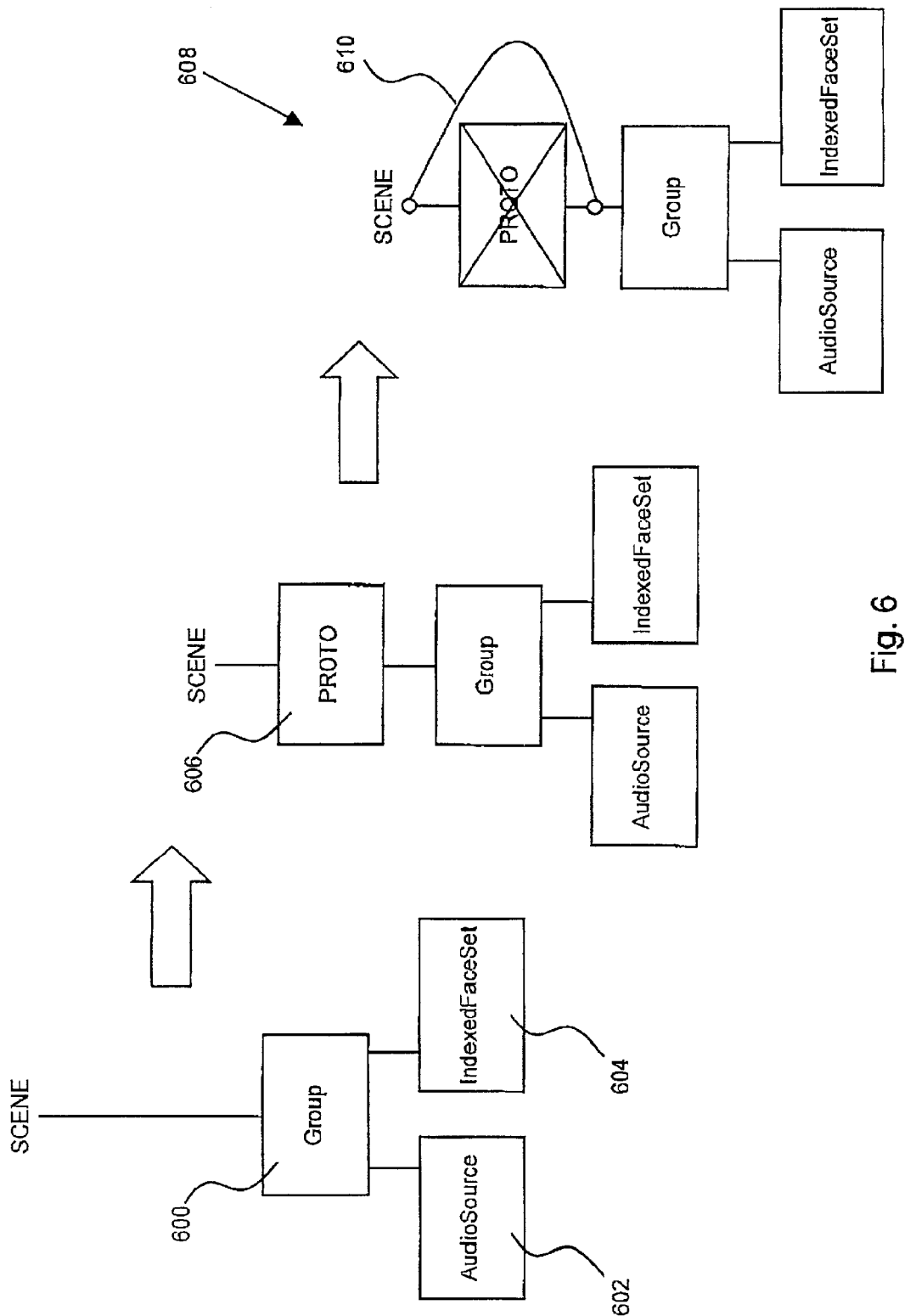
FIG. 6 is a simplified pictorial illustration of PROTO structures useful in understanding the concept of hiding PROTO structures from the Renderer, constructed and operative in accordance with a preferred embodiment of the present invention.

Once the PROTO object has been instantiated, it must be accessed from within the Renderer Plane (step 804). As explained above, the Renderer is typically implemented as an independent module from which the existence of PROTOs is preferably be hidden so that the Renderer will not need to be modified to accommodate PROTOs. The concept of hiding the PROTO from the Renderer may be more clearly understood with reference to FIG. 6. The Person object shown in FIGS. 3 and 4 is represented in a scene graph in FIG. 6 as a Group node 600 with two children, an AudioSource object 602 and an IndexedFaceSet object 604. A PROTO object 606 shows the Person object implemented as a PROTO. When the Renderer traverses the scene it encounters the Proto object 606. At some point in the scene, there is a pointer that points to the Group object 600 and to the PROTO object 606. For example, the C++ feature of operator overloading may be used, with the "pointing" operator (*) being overloaded inside the PROTO object 606 so that a pointer from the scene to the PROTO will be redirected to the first object of the PROTO code, in our case the Group node. A fill PROTO instance 608 is shown with an overloaded pointer 610.

Figure 9:
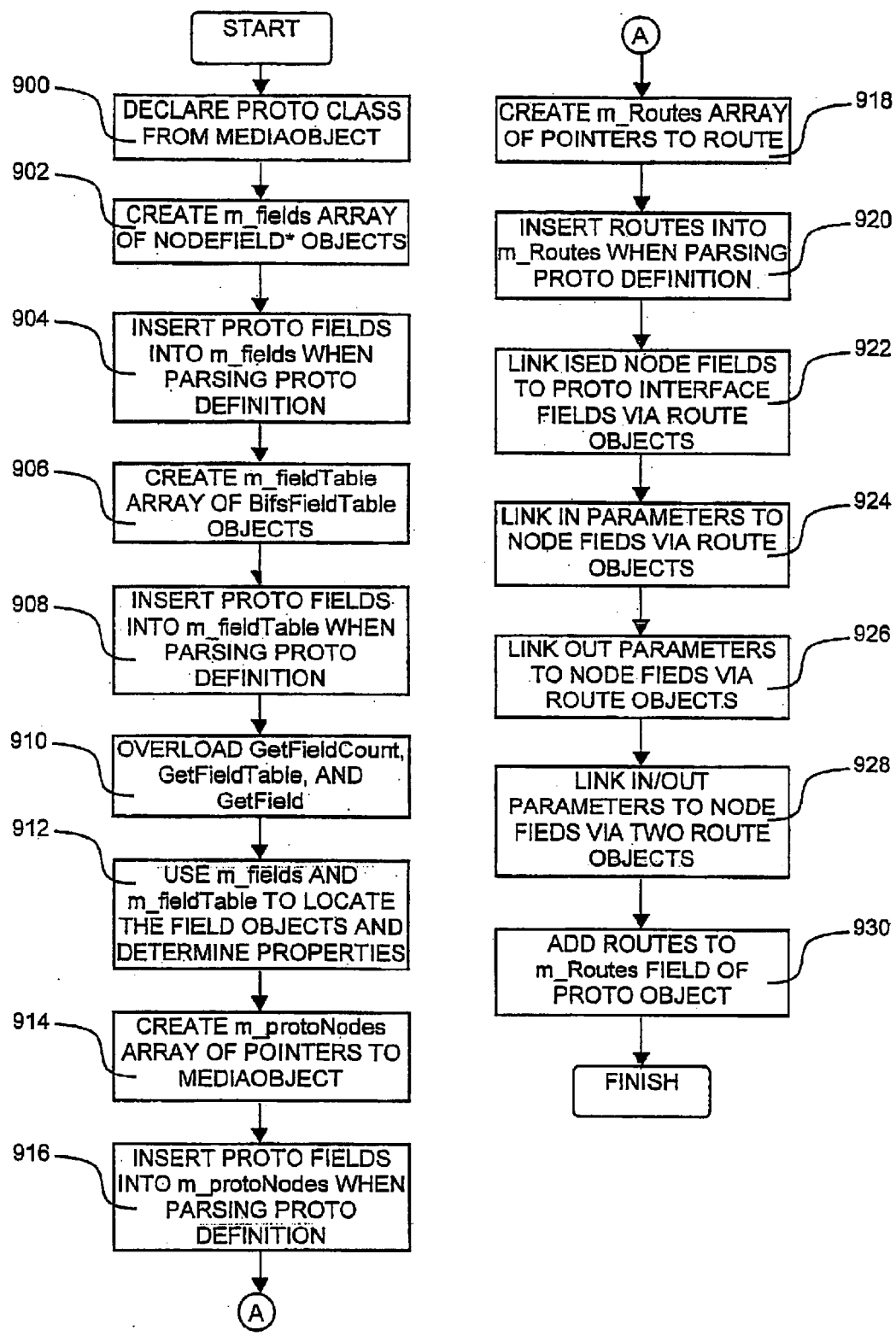
FIG. 9 is a simplified flowchart illustration of a method of PROTO class definition in MPEG-4, operative in accordance with a preferred embodiment of the present invention.

Reference is now made to FIG. 9 which is a simplified flowchart illustration of a method of PROTO class definition in MPEG-4, operative in accordance with a preferred embodiment of the present invention. In the method of FIG. 9 a class, referred to herein as "PROTO," is declared that is derived from MediaObject (step 900). PROTO preferably includes a member variable, referred to herein as "m_fields," that is an array of NodeField* objects (step 902). Unlike normal node fields that are bard coded as member variables of their node, the PROTO fields are preferably inserted into m_fields at run time, when the PROTO definition is parsed (step 904). The PROTO class also preferably includes a member variable, referred to herein as "m_fieldTable," that is an array of BifsFieldTable structures (step 906). Unlike normal node tables that are hard coded for each node by the BIFS_DECLARE_NODE macros mentioned hereinabove, the description of the PROTO fields is typically inserted into m_fieldTable at run time, when the PROTO definition is parsed (step 908). The PROTO class then overloads GetFieldCount, GetFieldTable and GetField (step 910), so that m_fields and m_fieldTable may be used to locate the field objects and determine their properties (step 912). In this manner, the object that calls these virtual methods doesn't need to know whether it is accessing a normal node or a PROTO.

The PROTO class also preferably includes a member variable, referred to herein as "m_protoNodes," that is an array of pointers to MediaObject (step 914). When parsing the PROTO definition, all the nodes making up the PROTO code are typically inserted into this array (step 916). The PROTO class also preferably includes a member variable, referred to herein as "m_Routes," that is an array of pointers to Route (step 918). When parsing the PROTO definition, all the routes that are part of the PROTO code are inserted into this array (step 920). All ISed node fields in the PROTO code are preferably linked to their corresponding PROTO interface fields by a Route object (step 922). IN parameters that can receive values may be linked by a route from the parameter to the node field (step 924). OUT parameters that can propagate values from the PROTO code out to the scene may be linked by a route from the node field to the parameter (step 926). Parameters that are both IN and OUT (referred to as "ExposedFields" in ISO/IEC 14496), may be linked by two routes, one for each direction (step 928). The routes are added to the m_Routes field of the PROTO (step 930), so that when all the PROTO's routes are instantiated, the link between the PROTO code and the PROTO interface is automatically established.

Figure 10:
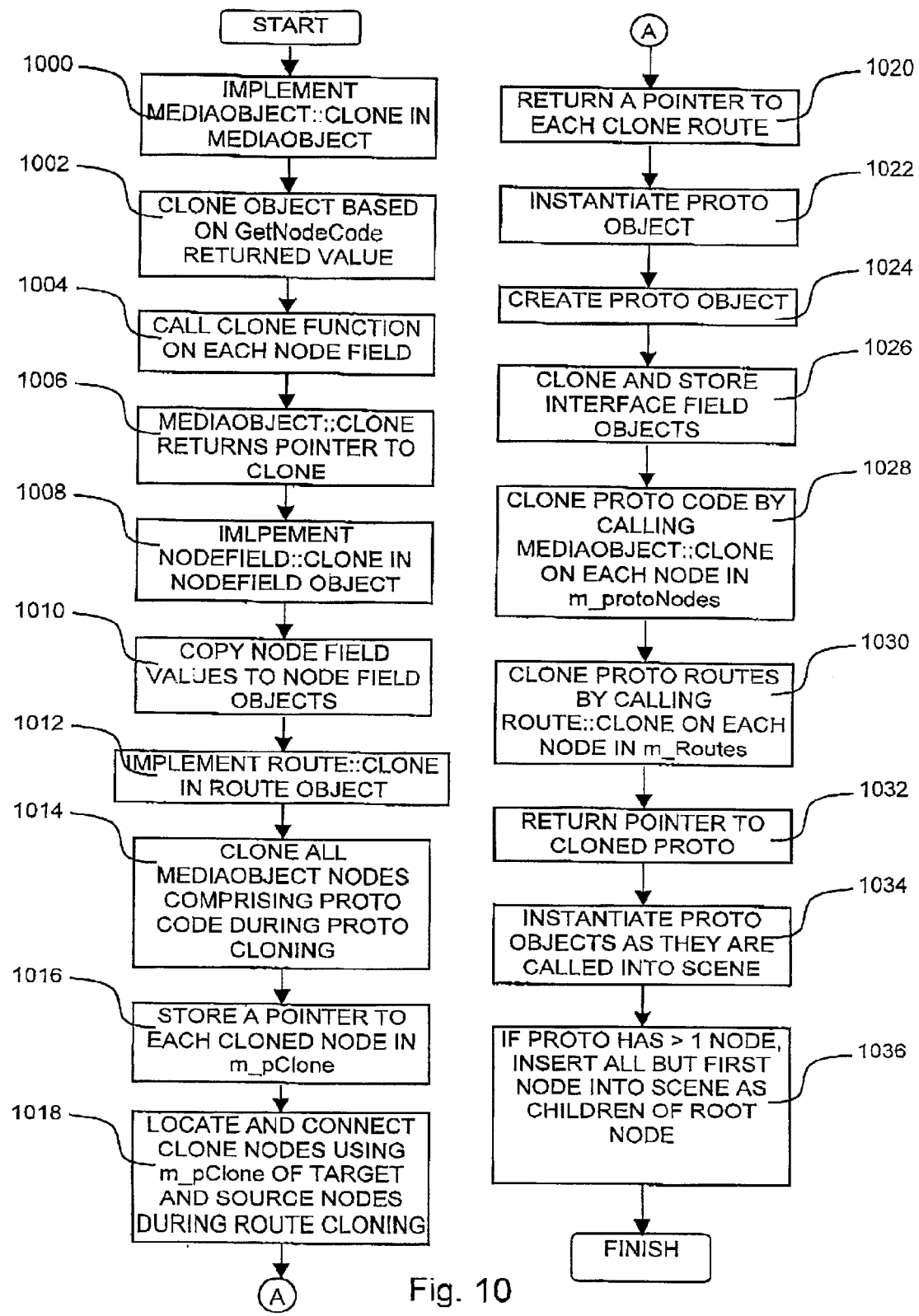
FIG. 10 is a simplified flowchart illustration of a method of PROTO instantiation in MPEG-4, operative in accordance with a preferred embodiment of the present invention.

Reference is now made to FIG. 10 which is a simplified flowchart illustration of a method of PROTO instantiation in MPEG-4, operative in accordance with a preferred embodiment of the present invention. In the method of FIG. 10 a new method is implemented in MediaObject, referred to herein as "MediaObject::Clone" (step 1000). This method is used to create a clone of the object by using the value returned by one of its virtual functions, referred to herein as "GetNodeCode," which identifies the type of the node that is represented by this object, to create the appropriate node object that is derived from MediaObject (step 1002). The Clone function then iterates through all the node fields using the GetField function and calls the Clone method on each of them (step 1004). MediaObject::Clone then returns a pointer to the newly created clone (step 1006). A new virtal method, referred to herein as "NodeField::Clone," is implemented in NodeField (step 1008). This method copies the value of the node field represented by this object to another NodeField object (step 1010). The NodeField::Clone method is preferably declared as pure in NodeField and implemented appropriately in each of the derived objects. NodeField::Clone may be called by MediaObject::Clone in order to copy all field values from one node to its clone.

A new method, referred to herein as "Route::Clone," is implemented in Route (step 1012). This method clones a route that connects two node fields between a source and a target node. The new route connects the same fields between the clones of the original source and target nodes. This may be accomplished as follows. During the cloning of a PROTO, all the MediaObject nodes comprising the PROTO code are cloned (step 1014). When cloning each node, a pointer to the clone is stored in a member variable of the original node, referred to herein as "m_pClone" (step 1016). When cloning the routes, the m_pClone fields of the target and source nodes of the original route are used to locate the two clone nodes and connect the two clone nodes with the new route (step 1018). Route::Clone then returns a pointer to the clone route (step 1020).

Figure 11:
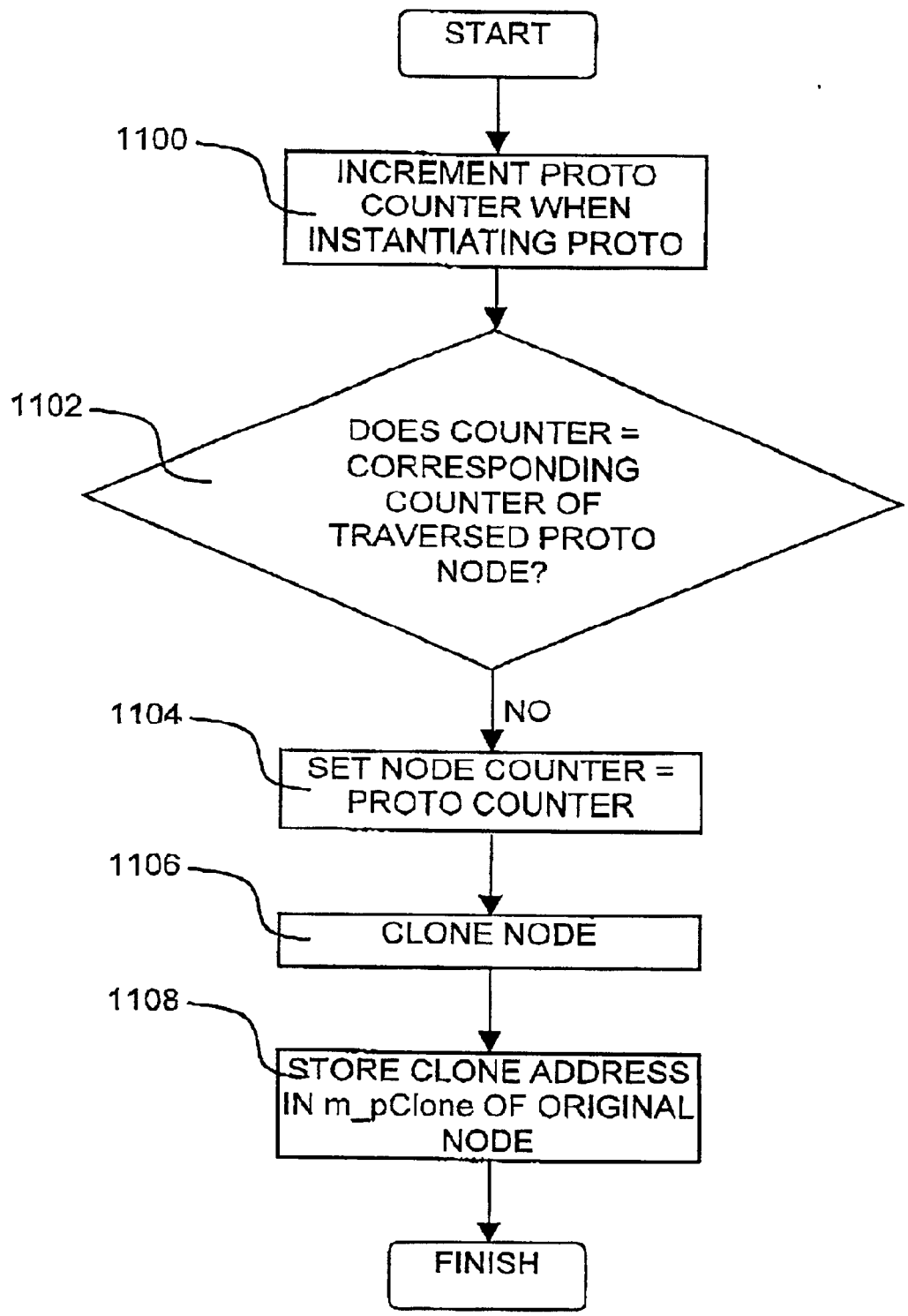
FIG. 11 is a simplified flowchart illustration of a method of cloning where there are multiple references of a PROTO in scene graph, operative in accordance with a preferred embodiment of the present invention.

The m_pClone field may also be used when a node has already been cloned because it has multiple references in the scene graph. This may be accomplished as shown in FIG. 11. When instantiating a PROTO, a counter field in the Proto object, referred to herein as "m_uCloningCounter," is incremented (step 1100). When traversing the nodes in the PROTO code, the value of m_uCloningCounter in the node is compared to the corresponding field of the PROTO (step 1102). If they are not equal, m_uCloningCounter of the node being traversed is set to the value of the corresponding field in the PROTO (step 1104). The node is then cloned (step 1106), and the address of the clone is stored in m_pClone of the original node (step 1108). If the counters are equal, then the node has already been cloned, and m_pClone points to the clone. This pointer may be used to refer to the clone node in the clone PROTO.

Referring once again to FIG. 10, a method in PROTO, referred to herein as "PROTO::Instantiate," may be called to instantiate a PROTO (step 1022). This causes the following to occur:

A new PROTO object is created (step 1024).

The interface field objects of the original PROTO, as stored in m-fields, are cloned, and the clones are stored in m-fields of the clone PROTO (step 1026).

The PROTO code is cloned by calling MediaObject:: Clone on each of the nodes in m_protoNodes (step 1028).

All the PROTO's routes are cloned by calling Route:: Clone on each of the routes in m_Routes (step 1030).

PROTO::Instantiate returns a pointer to the clone PROTO (step 1032).

Once a PROTO is instantiated (i.e., called into a scene) the corresponding PROTO object that was created at definition time is located in a global list of defined PROTOs and is instantiated by PROTO::Instantiate (step 1034). If the PROTO contains more then one node in its code as per m_protonades, all the nodes but the first are inserted into the scene as additional children of the root node (step 1036). The PROTO instance is inserted into the scene tree at the place where it is called in the same way that a normal node would be inserted. This is possible since because PROTO is derived from MediaObject.

Figure 12:
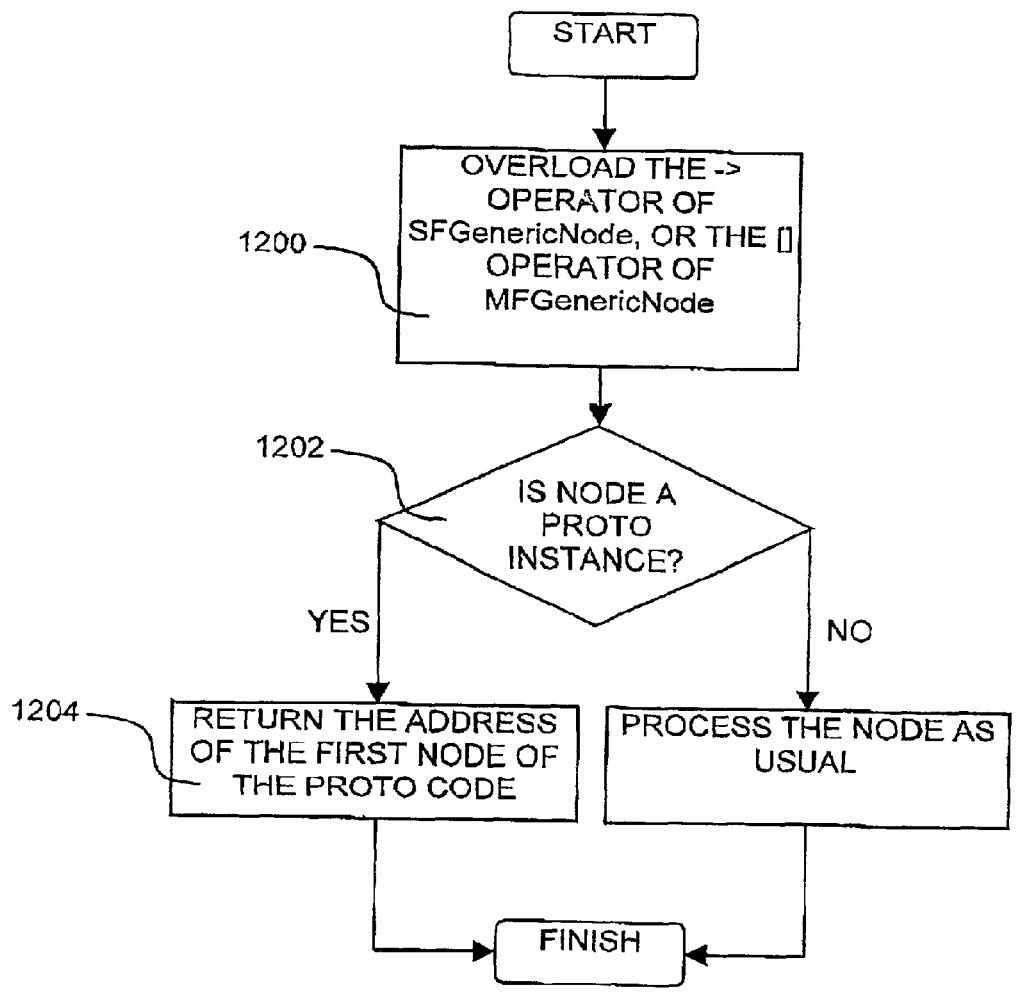
FIG. 12 is a simplified flowchart illustration of a method of PROTO access in MPEG-4, operative in accordance with a preferred embodiment of the present invention.

Reference is now made to FIG. 12 which is a simplified flowchart illustration of a method of PROTO access in MPEG-4, operative in accordance with a preferred embodiment of the present invention. At the Scene Manipulation Plane, nodes are always accessed generically through the MediaObject base class. Since PROTO is derived from MediaObject and implements its own version of GetField, PROTO instances are accessed just like normal nodes. Unfortunately, in the Renderer Plane the Renderer functions access node fields by their names and expect each SFNode field to point to a node of a specific type. Since the present invention allows for any node to be substituted with a PROTO, the Renderer might attempt to operate on a PROTO without knowing the object is a PROTO and without knowing how to operate on a PROTO. This problem may be solved by hiding the PROTO instance from the Renderer and causing the Renderer to go down to the first node of the PROTO code instead of to the PROTO node itself. This may be achieved in C++ by using operator overloading. SFNodes (i.e., MNodes) are implemented in IM1 by the SFGenericNode (i.e., MFenericNode) class or one of the classes derived from it (both SFGenericNode and MFGenericNode are derived from NodeField). IM1 overloads the –> operator of SFGenericNode, or the 0 operator of MFGenericNode, such that if "field" is an object of type SFGenericNode, "field–>" points to the child node (step 1200). Thus, the implementation of the –> and D overloads may be changed to ensure that the Renderer handles PROTOs properly. In this implementation the node that is pointed to is checked to see whether it is a regular node or a PROTO instance (step 1202). If it is a PROTO, it returns the address of the first node of the PROTO code, rather than the address of the PROTO itself (step 1204). This way the Renderer may traverse the entire scene graph, including PROTO codes, without being obstructed by PROTO instances that it cannot directly process.

The present invention thus implements PROTO in MPEG-4 by introducing a new PROTO class and minimally changing three existing classes, MediaObject, NodeField and Route. Other MPEG-4 modules, most notably the Renderer, may be used to implement the present invention without modification.

It is appreciated that one or more of the steps of any of the methods described herein may be omitted or carried out in a different order than that shown, without departing from the true spirit and scope of the invention.

It is appreciated that the methods and apparatus described herein may be implemented using computer hardware and/or software using conventional techniques.

The disclosures of all patents, patent applications, and other publications mentioned in this specification and of the patents, patent applications, and other publications cited therein are hereby incorporated by reference.

While the present invention has been described with reference to a few specific embodiments, the description is intended to be illustrative of the invention as a whole and is not to be constructed as limiting the invention to the embodiments shown. It is appreciated that various modifications may occur to those skilled in the art that while not specifically shown herein, are nevertheless within the true spirit and scope of the invention.

What is claimed is:

1. A method of PROTO implementation in MPEG-4 comprising defining a PROTO object class via inheritance from a MediaObject class;

instantiating a PROTO object via cloning of a definitive PROTO object;

calling said PROTO object into an MPEG-4 scene graph while overloading its –> operator; and rendering said PROTO object by using the overloaded –>operator.

2. A method according to claim 1 wherein said defining step comprises: defining said class by inheriting said class from MediaObject; defining in said class a variable representing an array of NodeField* objects; inserting PROTO fields into said array of NodeField* objects; defining in said class a variable representing an array of BifsFieldTable structures; inserting descriptions of said PROTO fields into said array of BifsFieldTable structures; overloading GetFieldCount, GetFieldTable and GetField methods of said PROTO class; locating PROTO field objects; defining in said class a variable representing an array of pointers to said MediaObject; inserting at least one PROTO code node into said array of pointers to said MediaObject; defining in said class an array of pointers to routes; inserting at least one PROTO code route into said array of pointers to routes; linking at least one PROTO code ISed node field to a corresponding PROTO interface field by a route object; lining at least one IN parameter to a node field by a route object; linking at least one OUT parameter to a node field by a route object; linking at least one IN/OUT parameter by two routes, one for each direction; and adding any of said routes to a field of said PROTO object.

3. A method according to claim 1 wherein said instantiating step comprises:

cloning an original PROTO object; cloning each node field of said original PROTO object; returning a pointer to said clone object; copying the value of each of said node fields to a NodeField object; cloning a route that connects two of said node fields between a source node and a target node; cloning at least one interface field object of said original PROTO object; storing said cloned interface field objects in said clone object; cloning at least one PROTO object node; cloning at least one PROTO object route; and returning a pointer to the clone PROTO.

4. A method according to claim 1 wherein said calling step comprises: overloading either of the −> operator of SFGenericNode and the operator of MFGenericNode of said PROTO object; and if the node that is pointed to is a PROTO instance, returning the address of the first node of said PROTO objects PROTO code.

* * * * *